United States Patent
Zeiynali Farid et al.

(10) Patent No.: US 12,451,005 B2
(45) Date of Patent: Oct. 21, 2025

(54) SYSTEMS, METHODS, AND NON-TRANSITORY COMPUTER-READABLE MEDIUMS FOR ESTIMATING A POSITION OF A TAIL OF A VEHICLE QUEUE

(71) Applicant: Toyota Motor Engineering & Manufacturing North America, Inc., Plano, TX (US)

(72) Inventors: Yashar Zeiynali Farid, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 210 days.

(21) Appl. No.: 18/118,331

(22) Filed: Mar. 7, 2023

(65) Prior Publication Data
US 2024/0304082 A1    Sep. 12, 2024

(51) Int. Cl.
G08G 1/01    (2006.01)

(52) U.S. Cl.
CPC ......... G08G 1/0137 (2013.01); G08G 1/0112 (2013.01); G08G 1/0125 (2013.01)

(58) Field of Classification Search
CPC ... G08G 1/0137; G08G 1/0112; G08G 1/0125
See application file for complete search history.

(56) References Cited

U.S. PATENT DOCUMENTS

| | | | |
|---|---|---|---|
| 5,293,163 | A | 3/1994 | Kakihara |
| 6,268,804 | B1 * | 7/2001 | Janky ................. G01S 19/48 |
| | | | 340/904 |
| 6,411,328 | B1 | 6/2002 | Franke et al. |
| 9,240,123 | B2 | 1/2016 | Stenneth |
| 9,449,509 | B2 | 9/2016 | Koshizen et al. |
| 9,847,024 | B2 | 12/2017 | Witte et al. |
| 10,388,152 | B2 | 8/2019 | Biehle et al. |
| 10,908,607 | B2 | 2/2021 | Patel et al. |
| 2007/0005231 | A1 | 1/2007 | Seguchi |
| 2018/0217610 | A1 * | 8/2018 | Schuh ................. G05D 1/0293 |
| 2019/0180617 | A1 * | 6/2019 | Hori ................. B60W 50/0097 |
| 2019/0389465 | A1 * | 12/2019 | Ogino ................. B60T 7/22 |

(Continued)

OTHER PUBLICATIONS

Sven-Eric Molzahn et al., ScienceDirect, Transportation Research Procedia 27 (2017) pp. 808-815, Sep. 6, 2017, "Jam tail warnings based on vehicle probe data" (https://www.researchgate.net/publication/322238207_Jam_Tail_Warnings_Based_on_Vehicle_Probe_Data).

*Primary Examiner* — John Olszewski
(74) *Attorney, Agent, or Firm* — Dinsmore & Shohl LLP

(57) ABSTRACT

Systems, methods, and non-transitory computer-readable medium for estimating a position of a tail of a vehicle queue are provided. The methods include determining an initial estimated position of a tail of a vehicle queue comprising a plurality of vehicles relative to a beginning of a road section using vehicle sensors, estimating distance between a preceding vehicle and the tail of the vehicle queue based on driving data of the preceding vehicle, estimating a position of the tail based on the estimated distance and distance between an ego vehicle and the preceding vehicle, and estimating a final position of the tail based on the initial estimated position and the estimated position of the tail.

20 Claims, 9 Drawing Sheets

(56) References Cited

U.S. PATENT DOCUMENTS

| | | | |
|---|---|---|---|
| 2022/0126874 A1* | 4/2022 | Oh | B60W 60/00274 |
| 2022/0139214 A1* | 5/2022 | Pittman | H04W 4/80 |
| | | | 340/907 |
| 2022/0163960 A1* | 5/2022 | Cella | G05B 19/4185 |
| 2023/0135207 A1* | 5/2023 | Schuh | G06V 20/56 |
| | | | 342/70 |

* cited by examiner

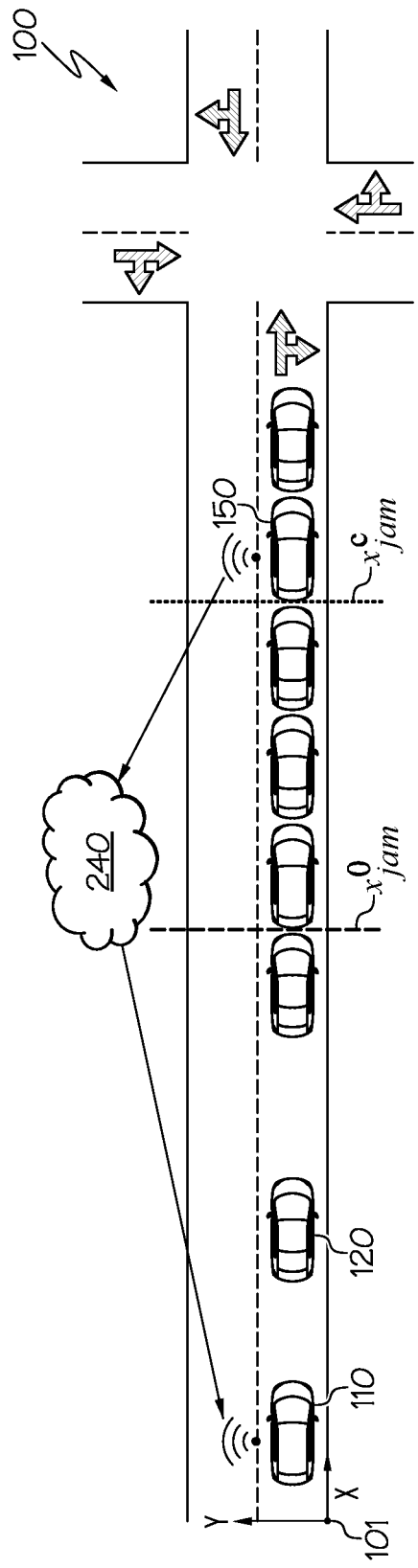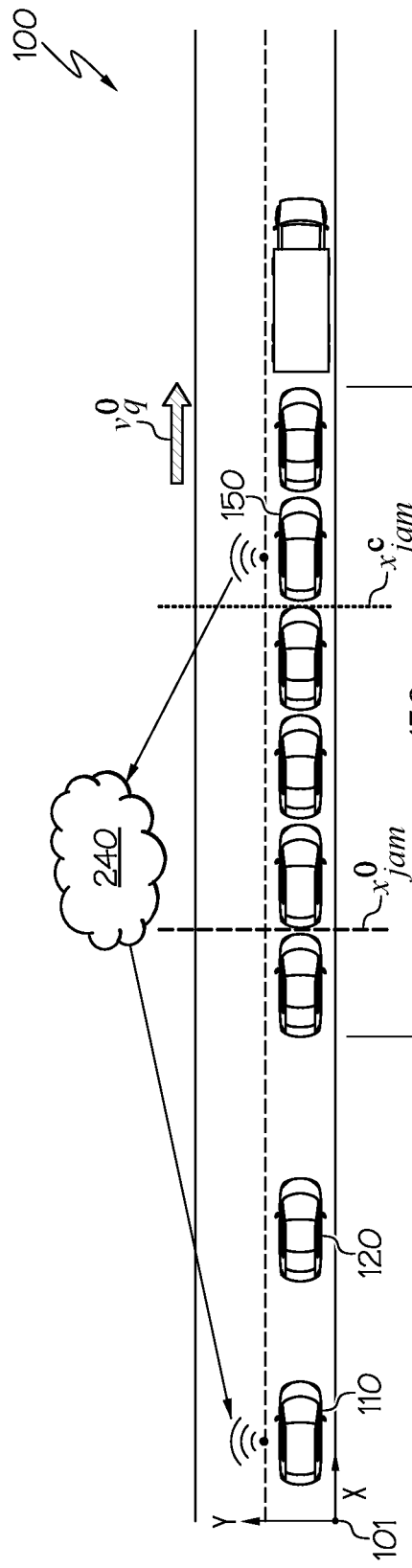

SYSTEMS, METHODS, AND NON-TRANSITORY COMPUTER-READABLE MEDIUMS FOR ESTIMATING A POSITION OF A TAIL OF A VEHICLE QUEUE

TECHNICAL FIELD

The present disclosure relates to systems, methods, and non-transitory computer-readable mediums for estimating a position of a tail of a vehicle queue.

BACKGROUND

Accurately estimating a current state of traffic information plays a key role in the success of a vehicle's motion planning systems. An important traffic state includes the position of the tail of the vehicle queue. When a vehicle plans its behaviors (e.g., acceleration or lane-change) using an inaccurate tail position, the planned behavior can be inefficient. For instance, if a vehicle wants to change its lane before hitting a congested lane, an inaccurate tail position may cause the vehicle to get stuck in the traffic queue. Detecting the tail of the vehicle queue may be challenging due to the limitations of the sensors, such as a detection range. When the tail is in the detection range of the ego vehicle's sensor, such as a radar, its preceding vehicle may block the ego vehicle's view. The radar of the ego vehicle may only detect the motions of the preceding vehicle, not the vehicles in front of the preceding vehicle.

Accordingly, a need exists for systems, methods, and non-transitory computer-readable mediums that accurately estimate a position of a tail of a vehicle queue.

SUMMARY

The present disclosure provides systems, methods, and non-transitory computer-readable mediums for estimating a position of a tail of a vehicle queue. The systems, methods, and non-transitory computer-readable mediums accurately estimate a position of a tail of a vehicle queue by determining an initial estimated position of a tail of a vehicle queue and estimating a final position of the tail based on the initial estimated position and the estimated position of the tail using at least vehicles sensors, cloud server, maps, or combinations thereof. With the accurate estimation of the tail of the vehicle queue, the ego vehicle may have an efficient motion system, such as acceleration, lane-change.

In one or more embodiments, a method of estimating a position of a tail of a vehicle queue includes determining an initial estimated position of a tail of a vehicle queue comprising a plurality of vehicles relative to a beginning of a road section using vehicle sensors, estimating distance between a preceding vehicle and the tail of the vehicle queue based on driving data of the preceding vehicle, estimating a position of the tail based on the estimated distance and distance between the beginning of the road section and the preceding vehicle, and estimating a final position of the tail based on the initial estimated position and the estimated position of the tail.

In another embodiment, a system of estimating a position of a tail of a vehicle queue includes a controller. The controller is programmed to determine an initial estimated position of a tail of a vehicle queue comprising a plurality of vehicles relative to a beginning of a road section using vehicle sensors, estimate a distance between a preceding vehicle and the tail of the vehicle queue based on driving data of the preceding vehicle, estimate a position of the tail based on the estimated distance and distance between the beginning of the road section and the preceding vehicle, and estimate a final position of the tail based on the initial estimated position and the estimated position of the tail.

In yet another embodiment, a non-transitory computer-readable medium for estimating a position of a tail of a vehicle queue that, when executed by a controller, causes the controller to determine an initial estimated position of a tail of a vehicle queue comprising a plurality of vehicles relative to a beginning of a road section using vehicle sensors, estimate a distance between a preceding vehicle and the tail of the vehicle queue based on driving data of the preceding vehicle, estimate a position of the tail based on the estimated distance and distance between the beginning of the road section and the preceding vehicle, and estimate a final position of the tail based on the initial estimated position and the estimated position of the tail.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIGS. 5A-5C depict an exemplary system of estimating the position of a tail of a vehicle queue, according to one or more embodiments shown and described herein; and FIG. 6 depicts an exemplary system of estimating the position of a tail of a vehicle queue, according to one or more embodiments shown and described herein.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Figure 1A:
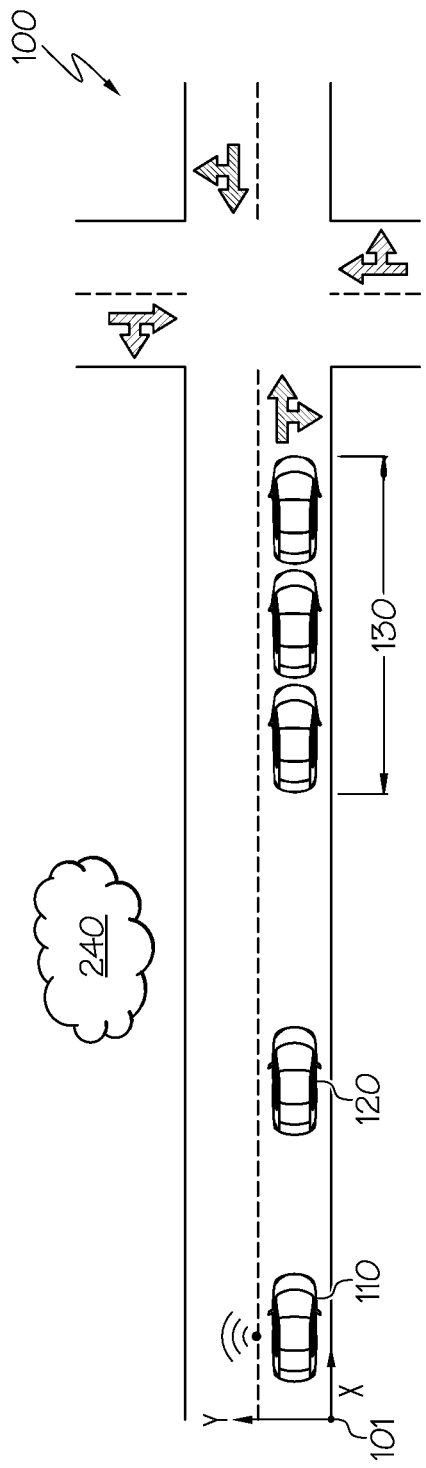
FIGS. 1A-1E depict an exemplary system of estimating the position of a tail of a vehicle queue, according to one or more embodiments shown and described herein.

The embodiments disclosed herein include systems, methods, and non-transitory computer-readable mediums for estimating a position of a tail of a vehicle queue. The systems, methods, and non-transitory computer-readable mediums accurately estimate a position of a tail of a vehicle queue by determining an initial estimated position of a tail of a vehicle queue and estimating a final position of the tail based on the initial estimated position and the estimated position of the tail using vehicles sensors. The systems, methods, and non-transitory computer-readable mediums may further use cloud data stored in a server, such as a cloud server, a map stored in a server, such as a cloud server, a macroscopic traffic model, or combinations thereof.

FIGS. 1A-1E depict an exemplary system of estimating a position of a tail of a vehicle queue, according to one or more embodiments shown and described herein.

Referring to FIGS. 1A-1E, the system 100 of estimating a position of a tail of a vehicle queue 130 includes an ego vehicle 110. A preceding vehicle 120 may exist between the ego vehicle 110 and the vehicle queue 130. The vehicle queue 130 may exist and stop at the intersection. The map of the intersection may be stored in the server 240. The ego vehicle 110 and the preceding vehicle 120 may approach the vehicle queue 130.

The ego vehicle 110 may be a vehicle including an automobile or any other passenger or non-passenger vehicle such as, for example, a terrestrial, aquatic, and/or airborne vehicle. In some embodiments, the ego vehicle 110 may be an autonomous driving vehicle. The ego vehicle 110 may be an autonomous vehicle that navigates its environment with limited human input or without human input. The ego vehicle 110 may be equipped with internet access and share data with other devices both inside and outside the ego vehicle 110. The ego vehicle 110 may communicate with the server 240, and transmit its data to the server 240. For example, the ego vehicle 110 transmits information about its current location and destination, its environment, information about a current driver, information about a task that it is currently implementing, and the like. The ego vehicle 110 may include an actuator configured to move the ego vehicle 110.

Referring to FIG. 1A, the ego vehicle 110 may determine an initial estimated position of a tail of a vehicle queue 130 relative to the beginning of the road section 101 using vehicle sensors. The vehicle queue 130 may include a plurality of vehicles. In some embodiments, the vehicle queue 130 may exist and stop at the intersection, an on-ramp of a highway, an off-ramp of a highway, or combinations thereof.

Figure 1B:
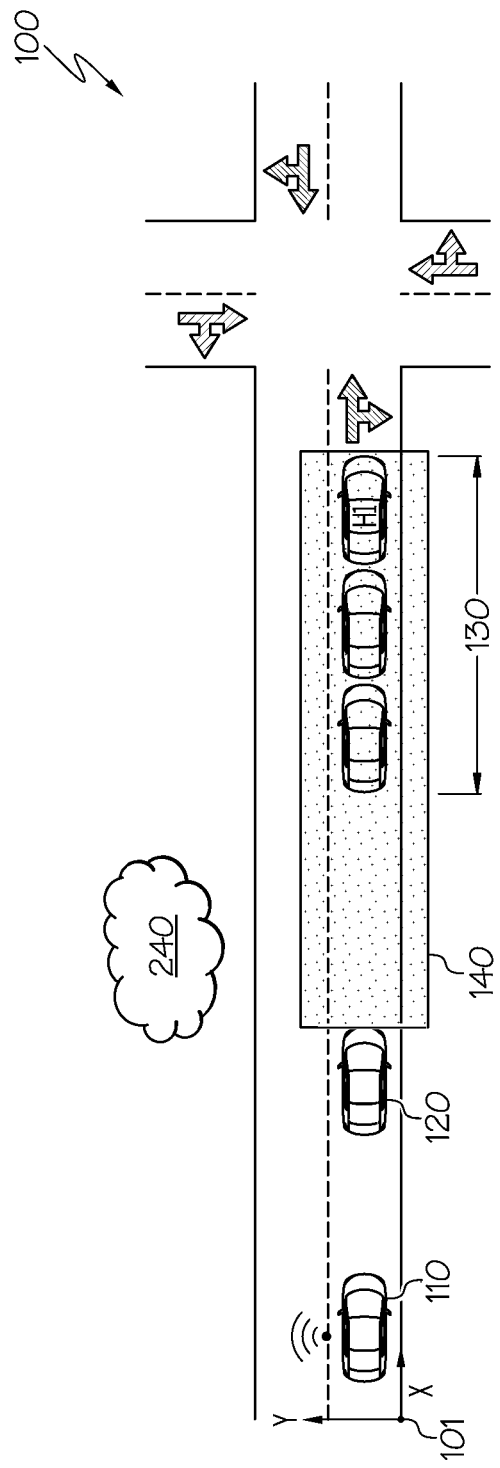
Figure 1C:
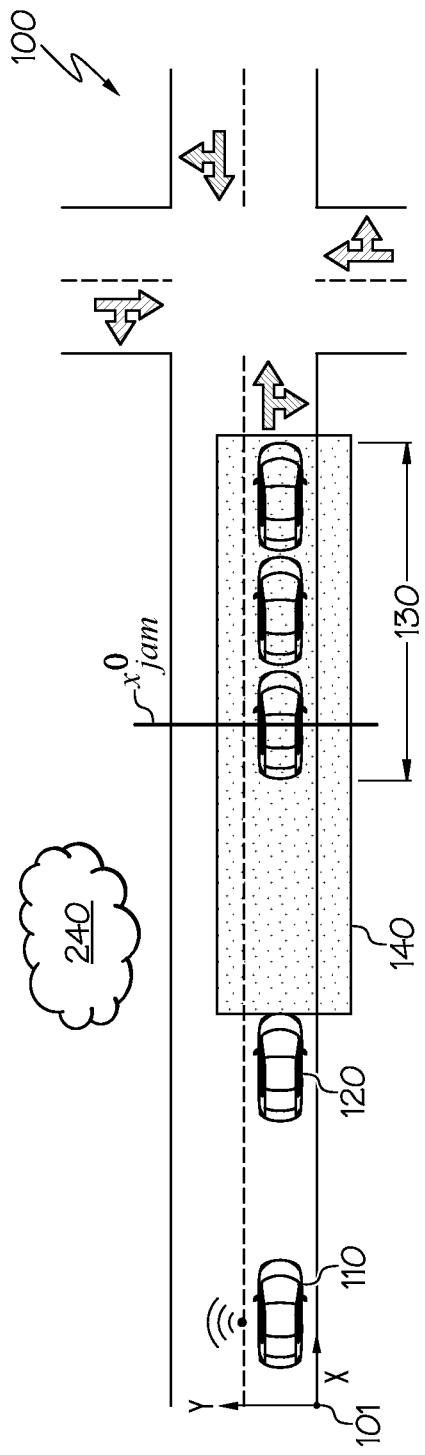

Referring to FIGS. 1B and 1C, the ego vehicle 110 may determine a middle point of a potential jam area 140 including the vehicle queue 130 as the initial estimated position of the tail. The potential jam area 140 may be defined as an area between an intersection and the backside of the preceding vehicle 120. For example, the potential jam area 140 and the initial estimated position may be described as Equation 1.

$$x_{jam}^0 = \frac{x_{int} + x_H + l_H}{2}$$
Equation 1 where $x_{jam}^0$ is the initial estimated position of the tail relative to a beginning of a road section 101, or a path position of the tail from the beginning of the road section 101; $x_{int}$ is the position of the ego vehicle 110 relative to the beginning of a road section 101, or a path position of the ego vehicle from the beginning of the road section 101; $x_H$ is the position of rear bumper of the preceding vehicle 120 relative to the beginning of a road section 101, or a path position of the pending vehicle 120 from the beginning of the road section 101; and $l_H$ is the length of the preceding vehicle 120. The beginning of the road section 101 may be a predetermined position behind the ego vehicle 110, for example, an intersection that the ego vehicle 110 just passed.

In some embodiments, in response to detecting a deceleration of the preceding vehicle 120 by the ego vehicle 110, the ego vehicle 110 may activate determining the initial estimated position of the tail of the vehicle queue 130.

Figure 1D:
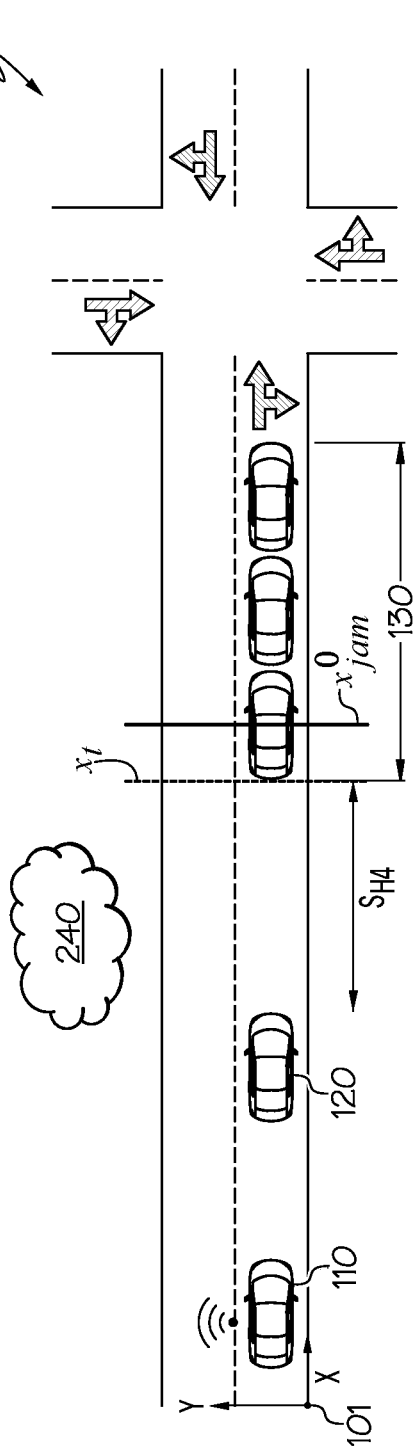

Referring to FIG. 1D, the ego vehicle 110 may estimate a distance between the preceding vehicle 120 and the tail of the vehicle queue 130 based on driving data of the preceding vehicle 120. In some embodiments, the driving data of the preceding vehicle 120 may include a velocity of the preceding vehicle 120, an acceleration of the preceding vehicle 120, a position of the preceding vehicle 120 relative to the beginning of the road section 101, a position of the preceding vehicle 120 relative to the ego vehicle 110, or combinations thereof. The ego vehicle 110 may estimate the driving data of the preceding vehicle 120 using the vehicle sensors of the ego vehicle 110, such as radars. In some embodiments, the ego vehicle 110 may not estimate the driving data of vehicles in the vehicle queue 130. For example, the ego vehicle 110 may not estimate the driving data of the closest vehicle in the vehicle queue 130 from the preceding vehicle 120.

In embodiments, the ego vehicle 110 may estimate a distance between the front side of the preceding vehicle 120 and the backside of the closest vehicle in the vehicle queue 130 from the preceding vehicle 120. In some embodiments, the ego vehicle 110 may estimate a shortest distance between the front side of the preceding vehicle 120 and the backside of the closest vehicle in the vehicle queue 130 from the preceding vehicle 120.

In embodiments, based on the velocity of the preceding vehicle 120, the acceleration of the preceding vehicle 120, the position of the preceding vehicle 120 relative to the beginning of the road section 101, the ego vehicle 110 may estimate the distance between the preceding vehicle 120 and the tail of the vehicle queue 130. In some embodiments, the ego vehicle 110 may estimate the distance ($\widehat{s_H}$) between the preceding vehicle 120 and the closest vehicle in the vehicle queue 130 from the preceding vehicle 120. In embodiments, the ego vehicle 110 may use a car-following model to estimate the distance ($s_H$) between the preceding vehicle 120 and the closest vehicle in the vehicle queue 130 from the preceding vehicle 120. The ego vehicle 110 may utilize a car-following model which estimates an acceleration of a vehicle given a certain traffic state. An example of a car-following model is Intelligent Driving Model as shown in Equations 3 and 4.

$$accel_\alpha = \frac{dv_\alpha}{dt} = f(s_\alpha, v_\alpha, \Delta v_\alpha) = a\left(a - \left(\frac{v_\alpha}{v_0}\right)^\delta - \left(\frac{s^*(v_\alpha, \Delta v_\alpha)}{s_\alpha}\right)^2\right)$$
Equation 2

$$s^*(v_\alpha, \Delta v_\alpha) = s_0 + v_\alpha T + \frac{v_\alpha \Delta v_\alpha}{2\sqrt{ab}}$$
Equation 3 where $s_\alpha$, $v_\alpha$, and $\Delta v_\alpha$ are the distance between the preceding vehicle 120 and the closest vehicle in the vehicle queue 130, the speed of the preceding vehicle 120, and the difference between the speed of the preceding vehicle 120 and the speed of the closest vehicle in the vehicle queue 130; $\alpha$, $s_\alpha$, $v_\alpha$, and $\Delta v_\alpha$ are inputs; and T, a, b, $v_0$, $s_0$ and $\delta$ are parameters of the model.

Based on the acceleration of the preceding vehicle 120 estimated by using a car-following model, and the velocity of the preceding vehicle 120 and the velocity difference between the preceding vehicle 120 and the closest vehicle in the vehicle queue 130 from the preceding vehicle 120 estimated by using the vehicle sensors of the ego vehicle 110, the ego vehicle 110 may estimate the distance ($\widehat{s_H}$) between the preceding vehicle 120 and the closest vehicle in the vehicle queue 130 from the preceding vehicle 120, i.e., $\widehat{s_H}$ =f(accel$_\alpha$, v$_\alpha$, $\Delta$v$_\alpha$).

The ego vehicle 110 may estimate a position of the tail based on the estimated distance and distance between the beginning of the road section 101 and the preceding vehicle 120. In some embodiments, the ego vehicle 110 may estimate a position of the tail based on the estimated distance and distance between the beginning of the road section 101 and the backside of the preceding vehicle 120. For example, in response to estimating the distance ($\widehat{s_H}$), the ego vehicle 110 may estimate a position of the tail of the vehicle queue 130 as shown in Equation 4.

$$\widehat{x_{jam}} = \widehat{s_H} + x_H + l_H \qquad \text{Equation 4}$$

where x$_{jam}$ is the position of the tail of the vehicle queue 130 relative to a beginning of a road section 101; x$_H$ is the position of rear bumper of the preceding vehicle 120 relative to a beginning of a road section 101; and l$_H$ is the length of the preceding vehicle 120.

The ego vehicle 110 may estimate the position of the tail of the vehicle queue 130 using a moving average method as shown in Equation 5. The moving average may be calculated using the below Equation 5.

$$\widehat{x_t} = \begin{cases} x_{jam}^0 & \text{if } t = 0 \\ \gamma * \widehat{x_{jam}} + (1-\gamma) * \widehat{x_{t-1}} & \text{if } t > 0 \end{cases} \qquad \text{Equation 5}$$

where $\gamma$ is a smoothing factor between 0 and 1; and $\widehat{x_{t-1}}$ is the estimated position of the tail of the vehicle queue 130 relative to a beginning of a road section 101 at the previous time step.

Figure 1E:
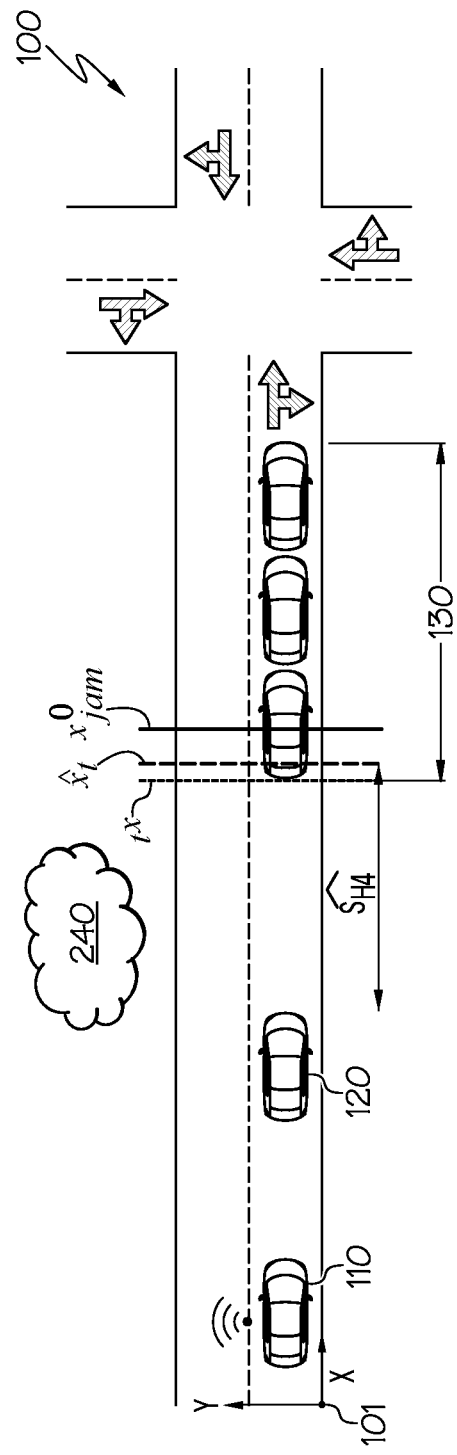

Referring to FIG. 1E, the ego vehicle 110 may estimate a final position (x$_t$) of the tail based on the initial estimated position and the estimated position of the tail. In embodiments, the ego vehicle 110 may estimate a first position of the tail at a first time (t$_1$) based on a moving average of the estimated position of the tail, i.e., $\widehat{x_t}$ when t=t$_1$ according to Equation 5. The ego vehicle 110 may estimate a second position of the tail at a second time (t$_2$) based on the moving average of the estimated position of the tail, i.e., $\widehat{x_t}$ when t=t$_2$ according to Equation 5. The second time is different from the first time. The second time is after the first time. The ego vehicle 110 may determine the second position of the tail at the second time as the final position of the tail in response to determining that a difference between the first position of the tail at the first time and the second position of the tail at the second time is lower than a threshold value.

For example, the ego vehicle 110 may terminate estimating the position of the tail of the vehicle queue 130 in response to determining that a new estimated position, such as a second position, of the tail is close to the previously estimated position, such as a first position, of the tail. For instance, as shown in Equation 6, in response to determining the preceding vehicle 120 is stopped, the ego vehicle 110 may determine the second position of the tail as the final position of the tail of the vehicle queue 130 and terminate estimating the position of the tail.

$$\widehat{x_t} - \widehat{x_{t-1}} < \varepsilon \qquad \text{Equation 6}$$

where $\varepsilon$ is a design parameter threshold.

Figure 2:
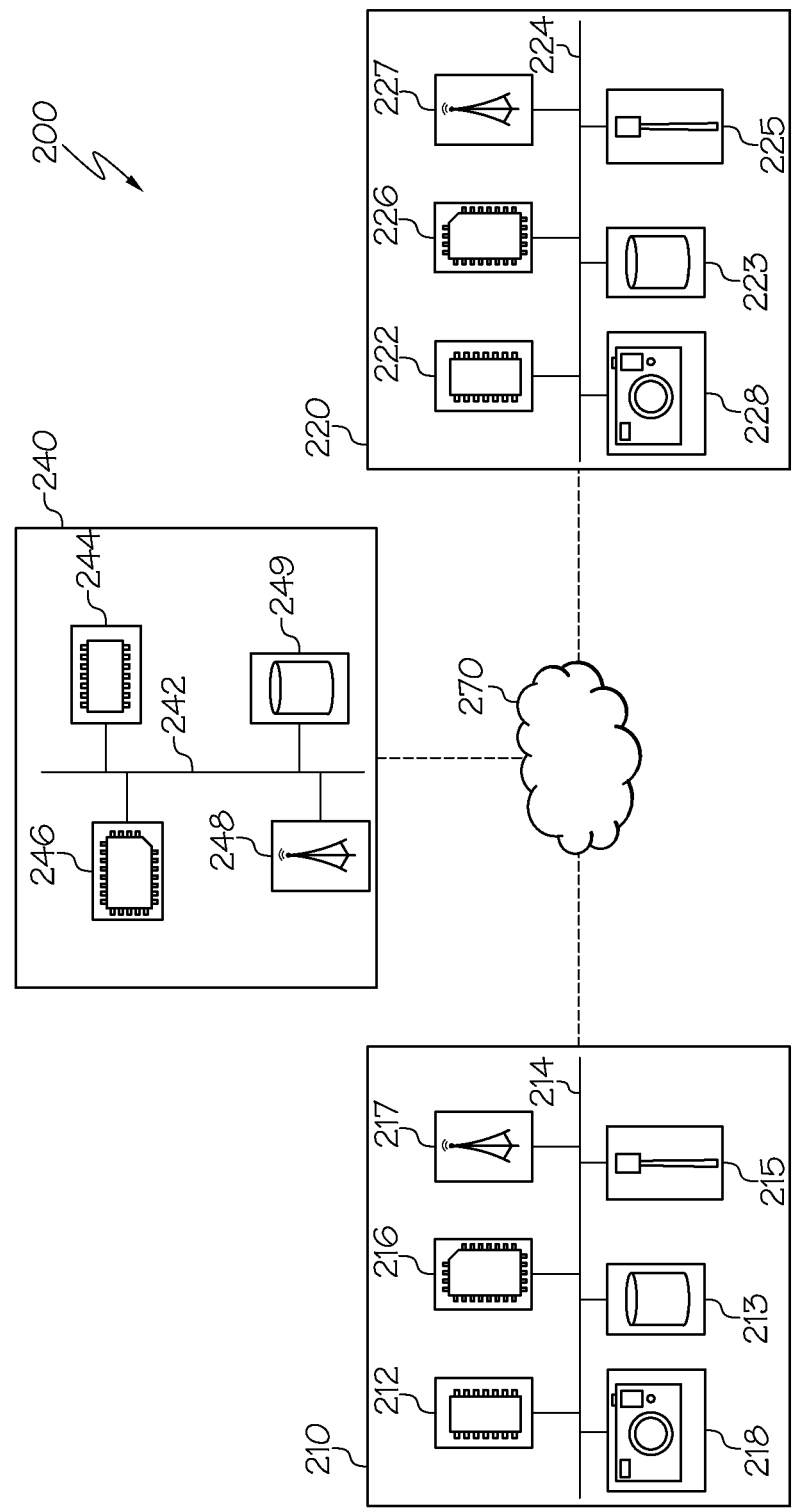
FIG. 2 depicts a schematic diagram of systems of estimating the position of a tail of a vehicle queue, according to one or more embodiments shown and described herein.

FIG. 2 depicts a schematic diagram of systems of estimating a position of a tail of a vehicle queue 130, according to one or more embodiments shown and described herein.

Referring to FIG. 2, the system 200 includes a vehicle system 210, and the server 240. In some embodiments, the system 200 may further include a connected vehicle system 220.

The vehicle system 210 includes one or more processors 212. Each of the one or more processors 212 may be any device capable of executing machine-readable and executable instructions. Each of the one or more processors 212 may be a controller, an integrated circuit, a microchip, a computer, or any other computing device. One or more processors 212 are coupled to a communication path 214 that provides signal interconnectivity between various modules of the system. The communication path 214 may communicatively couple any number of processors 212 with one another, and allow the modules coupled to the communication path 214 to operate in a distributed computing environment. Each of the modules may operate as a node that may send and/or receive data. As used herein, the term "communicatively coupled" means that coupled components are capable of exchanging data signals with one another such as electrical signals via a conductive medium, electromagnetic signals via air, optical signals via optical waveguides, and the like.

The communication path 214 may be formed from any medium that is capable of transmitting a signal such as conductive wires, conductive traces, optical waveguides, or the like. In some embodiments, the communication path 214 may facilitate the transmission of wireless signals, such as WiFi, Bluetooth®, Near Field Communication (NFC), and the like. The communication path 214 may be formed from a combination of mediums capable of transmitting signals. In one embodiment, the communication path 214 comprises a combination of conductive traces, conductive wires, connectors, and buses that cooperate to permit the transmission of electrical data signals to components such as processors, memories, sensors, input devices, output devices, and communication devices. The communication path 214 may comprise a vehicle bus, such as a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The vehicle system 210 includes one or more memory modules 216 coupled to the communication path 214 and may contain non-transitory computer-readable medium comprising RAM, ROM, flash memories, hard drives, or any device capable of storing machine-readable and executable instructions such that the machine-readable and executable instructions can be accessed by the one or more processors 212. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored in the one or more memory modules 216. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 212 along with the one or more memory modules 216 may operate as a controller for the vehicle system 210.

Still referring to FIG. 2, the vehicle system 210 includes one or more sensors 218. One or more sensors 218 may be any device having an array of sensing devices capable of detecting radiation in an ultraviolet wavelength band, a visible light wavelength band, or an infrared wavelength band. One or more sensors 218 may detect the presence of the vehicle system 210, the presence of the preceding vehicle 120 (shown in FIG. 1A), the presence of the vehicle queue 130 (shown in FIG. 1A), the presence of the connected vehicle 150 (shown in FIG. 4A), the distance between the vehicle system 210 and the preceding vehicle 120 (shown in FIG. 1A), the distance between the vehicle system 210 and the vehicle queue 130 (shown in FIG. 1A), the distance between the vehicle system 210 and the connected vehicle 150 (shown in FIG. 4A), or combinations thereof. One or more sensors 218 may have any resolution. In some embodiments, one or more optical components, such as a mirror, fish-eye lens, or any other type of lens may be optically coupled to one or more sensors 218. In some embodiments, one or more sensors 218 may provide image data to one or more processors 212 or another component communicatively coupled to the communication path 214. In some embodiments, one or more sensors 218 may provide navigation support. In embodiments, data captured by one or more sensors 218 may be used to autonomously or semi-autonomously navigate the vehicle system 210.

In some embodiments, one or more sensors 218 include one or more imaging sensors configured to operate in the visual and/or infrared spectrum to sense visual and/or infrared light. In some embodiments, one or more sensors 218 include one or more LIDAR sensors, radar sensors, sonar sensors, or other types of sensors for gathering data that could be integrated into or supplement the data collection. Ranging sensors like radar sensors may be used to obtain rough depth and speed information for the view of the vehicle system 210.

The vehicle system 210 includes a satellite antenna 215 coupled to the communication path 214 such that the communication path 214 communicatively couples the satellite antenna 215 to other modules of the vehicle system 210. The satellite antenna 215 is configured to receive signals from global positioning system satellites. In one embodiment, the satellite antenna 215 includes one or more conductive elements that interact with electromagnetic signals transmitted by global positioning system satellites. The received signal is transformed into a data signal indicative of the location (e.g., latitude and longitude) of the satellite antenna 215 or an object positioned near the satellite antenna 215, by one or more processors 212.

The vehicle system 210 includes one or more vehicle sensors 213. Each of one or more vehicle sensors 213 is coupled to the communication path 214 and communicatively coupled to one or more processors 212. One or more vehicle sensors 213 may include one or more motion sensors for detecting and measuring motion and changes in the motion of the vehicle system 210. The motion sensors may include inertial measurement units. Each of the one or more motion sensors may include one or more accelerometers and one or more gyroscopes. Each of one or more motion sensors transforms sensed physical movement of the vehicle into a signal indicative of an orientation, a rotation, a velocity, or an acceleration of the vehicle.

Still referring to FIG. 2, the vehicle system 210 includes a network interface hardware 217 for communicatively coupling the vehicle system 210 to the server 240. The network interface hardware 217 may be communicatively coupled to the communication path 214 and may be any device capable of transmitting and/or receiving data via a network. The network interface hardware 217 may include a communication transceiver for sending and/or receiving any wired or wireless communication. For example, the network interface hardware 217 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 217 includes hardware configured to operate in accordance with the Bluetooth® wireless communication protocol. The network interface hardware 217 of the vehicle system 210 may transmit its data to the server 240. For example, the network interface hardware 217 of the vehicle system 210 may transmit vehicle data, location data, maneuver data, and the like to the server 240.

The vehicle system 210 may connect with one or more external vehicle systems (e.g., the preceding vehicle 120, the connected vehicle 150, or both) and/or external processing devices (e.g., a cloud server 240, or an edge server 240) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure.

Vehicles may function as infrastructure nodes to form a mesh network and connect dynamically on an ad-hoc basis. In this way, vehicles may enter and/or leave the network at will, such that the mesh network may self-organize and self-modify over time. The network may include vehicles forming peer-to-peer networks with other vehicles or utilizing centralized networks that rely upon certain vehicles and/or infrastructure elements. The network may include networks using the centralized server 240 and other central computing devices to store and/or relay information between vehicles.

Still referring to FIG. 2, the vehicle system 210 may be communicatively coupled to the connected vehicle system 220, the server 240, or both, by the network 270. In one embodiment, the network 270 may include one or more computer networks (e.g., a personal area network, a local area network, or a wide area network), cellular networks, satellite networks and/or a global positioning system and combinations thereof. The vehicle system 210 may be communicatively coupled to the network 270 via a wide area network, a local area network, a personal area network, a cellular network, a satellite network, etc. Suitable local area networks may include wired Ethernet and/or wireless technologies such as Wi-Fi. Suitable personal area networks may include wireless technologies such as IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the connected vehicle system 220 includes one or more processors 222, one or more memory modules 226, one or more sensors 228, one or more vehicle sensors 223, a satellite antenna 225, a network interface hardware 227, and a communication path 224 communicatively connected to the other components of connected vehicle system 220. The components of the connected vehicle system 220 may be structurally similar to and have similar functions as the corresponding components of the vehicle system 210 (e.g., the one or more processors 222 corresponds to the one or more processors 212, the one or more memory modules 226 corresponds to the one or more memory modules 216, the one or more sensors 228 corresponds to the one or more sensors 218, the satellite antenna 225 corresponds to the satellite antenna 215, the communication path 224 corresponds to the communication path 214, and the network interface hardware 227 corresponds to the network interface hardware 217).

Still referring to FIG. 2, the server 240 includes one or more processors 244, one or more memory modules 246, a network interface hardware 248, one or more vehicle sensors 249, and a communication path 242 communicatively connected to the other components of the vehicle system 210. The components of the server 240 may be structurally similar to and have similar functions as the corresponding components of the vehicle system 210 (e.g., the one or more processors 244 corresponds to the one or more processors 212, the one or more memory modules 246 corresponds to the one or more memory modules 216, the one or more vehicle sensors 249 corresponds to the one or more vehicle sensors 213, the communication path 242 corresponds to the communication path 214, and the network interface hardware 248 corresponds to the network interface hardware 217).

It should be understood that the components illustrated in FIG. 2 are merely illustrative and are not intended to limit the scope of this disclosure. More specifically, while the components in FIG. 2 are illustrated as residing within the vehicle system 210, this is a non-limiting example. In some embodiments, one or more of the components may reside external to the vehicle system 210, such as with the server 240.

Figure 3:
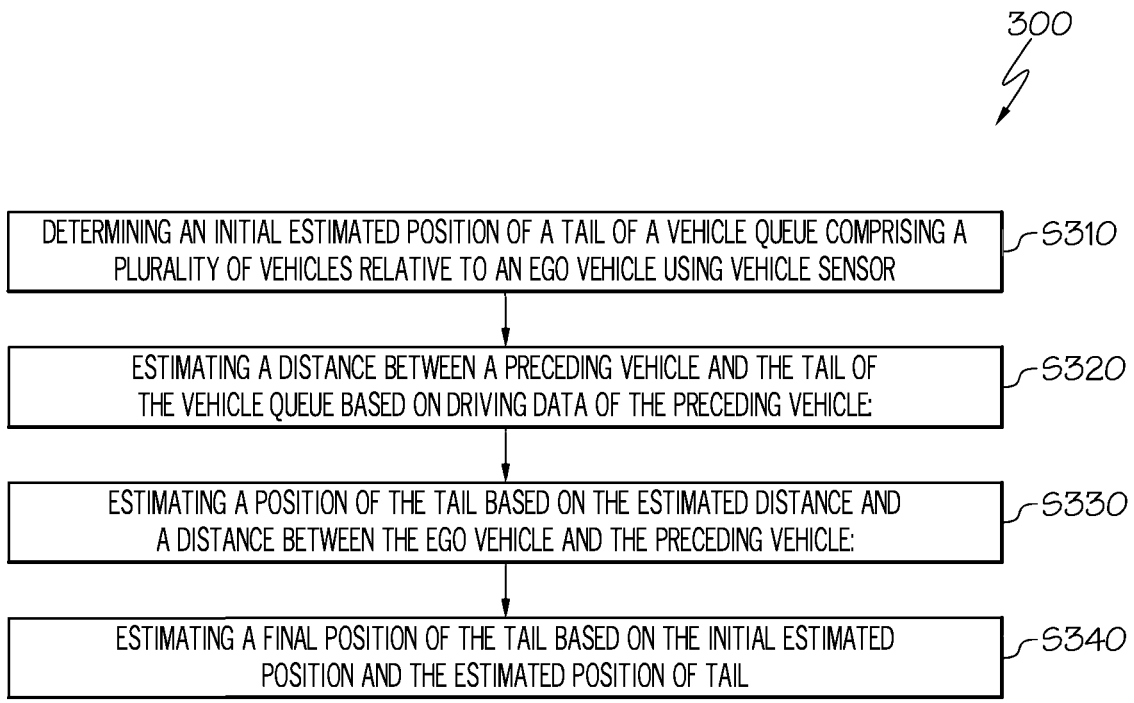
FIG. 3 depicts a flowchart for methods of estimating the position of a tail of a vehicle queue, according to one or more embodiments shown and described herein.

FIG. 3 depicts a flowchart for methods of estimating a position of a tail of a vehicle queue 130 that may be performed by the systems of FIGS. 1A-1E, according to one or more embodiments shown and described herein.

Referring to FIG. 3, in step S310, a controller, e.g., the controller of an ego vehicle 110, may determine an initial estimated position of a tail of a vehicle queue 130 relative to a beginning of a road section 101 using vehicle sensors. The beginning of the road section 101 may be predetermined prior to activate the methods of the present disclosure. In some embodiments, the beginning of the road section 101 may be a middle point of an intersection, or a beginning of off-ramp of a highway. The vehicle queue 130 may include a plurality of vehicles. In some embodiments, the vehicle queue 130 may exist and stop at the intersection, an on-ramp of a highway, an off-ramp of a highway, or combinations thereof. For example, referring to FIGS. 1A, 4A, and 5A, the vehicle queue 130 may exist and stop at the intersection. For example, referring to FIG. 6, the vehicle queue 130 may exist on the road. The map of the intersection and the road may be stored in the server 240.

Referring to FIGS. 1B and 1C, the controller may determine a middle point of a potential jam area 140 including the vehicle queue 130 as the initial estimated position of the tail. For example, the potential jam area 140 and the initial estimated position may be described as an equation in the above Equation 1 and Equation 1. Referring to FIG. 4B, the controller may determine a tail of the connected vehicle 150 as the initial estimated position of the tail of the vehicle queue 130. Referring to FIG. 5A-5C, the controller may estimate a position of the tail of the connected vehicle 150 at a first time. The controller may estimate traffic flow rate, traffic density, or both. In some embodiments, the traffic flow rate, the traffic density, or both, may be estimated by the vehicle sensors of the ego vehicle 110, the vehicle sensors of the preceding vehicle 120, the vehicle sensors of the connected vehicle 150, or combinations thereof. The controller may estimate an average speed ($v_{sw}$) of the tail of the vehicle queue 130 based on the estimated traffic flow rate, the estimated traffic density, or both. For example, the controller may estimate an average speed ($v_{sw}$) of the tail of the vehicle queue 130 based on the estimated traffic flow rate, the estimated traffic density, or both, using a macroscopic traffic model as shown in FIG. 5B. The controller may determine the initial estimated position of the tail of the vehicle queue 130 at a second time based on the estimated position of the tail of the connected vehicle 150 at the first time, for example, when the connected vehicle 150 arrives the vehicle queue 130, the average speed ($v_{sw}$) of the tail of the vehicle queue 130, and a difference between the first time and the second time. The initial estimated position of the tail of the vehicle queue 130 at a second time may be estimated using the below Equation 7. Referring to FIG. 6, similar to FIG. 5A, the controller may estimate a position of the tail of the connected vehicle 150 at a first time, for example, when the connected vehicle 150 arrives the vehicle queue 130. The controller may further a speed of the connected vehicle 150 at the first time, for example, when the connected vehicle 150 arrives the vehicle queue 130. The controller may determine the speed of the connected vehicle 150 as an initial estimated speed of the vehicle queue 130. The controller may estimate traffic flow rate, traffic density, or both based on the initial estimated speed of the vehicle queue 130. Similar to FIGS. 5B and 5C, the controller may estimate an average speed ($v_{sw}$) of the tail of the vehicle queue 130 based on the estimated traffic flow rate, the estimated traffic density, or both. The controller may determine the initial estimated position of the tail of the vehicle queue 130 at a second time based on the estimated position of the tail of the connected vehicle 150 at the first time, the initial estimated speed of the vehicle queue 130, and a difference between the first time and the second time. The initial estimated position of the tail of the vehicle queue 130 at a second time may be estimated using the below Equation 8.

Referring to FIG. 3, in step S320, the controller may estimate a distance between a preceding vehicle 120 and the tail of the vehicle queue 130 based on driving data of the preceding vehicle 120. For example, referring to FIG. 1D, the controller may estimate a distance between the preceding vehicle 120 and the tail of the vehicle queue 130 based on driving data of the preceding vehicle 120. In some embodiments, the controller may estimate a velocity of the preceding vehicle 120, an acceleration of the preceding vehicle 120, and a position of the preceding vehicle 120 relative to the beginning of the road section 101. In embodiments, the controller may estimate the velocity of the preceding vehicle 120 and the velocity difference between the preceding vehicle 120 and the closest vehicle in the vehicle queue 130 from the preceding vehicle 120 using the vehicle sensors of the ego vehicle 110. The controller may estimate the acceleration of the preceding vehicle 120 by using a car-following model as shown in the above Equation 2 and Equation 3.

Referring to FIG. 3, in step S330, the controller may estimate a position of the tail based on the estimated distance and the distance between the beginning of the road section 101 and the preceding vehicle 120. For example, referring to FIG. 1D, in response to estimating the distance ($\widehat{s_H}$), the controller may estimate a position of the tail of the vehicle queue 130 as shown in the above Equation 4. The controller may estimate the position of the tail of the vehicle queue 130 using a moving average method as shown in the above Equation 5.

Referring to FIG. 3, in step S340, the controller may estimate a final position of the tail based on the initial estimated position and the estimated position of the tail. For example, the controller may estimate a first position of the tail at a first time based on a moving average of the estimated position of the tail. The controller may estimate a second position of the tail at a second time based on the moving average of the estimated position of the tail. The controller may determine the second position of the tail of the vehicle queue 130 at the second time as the final position of the tail of the vehicle queue 130 in response to determining that a difference between the first position of the tail of the vehicle queue 130 at the first time and the second position of the tail of the vehicle queue 130 at the second time is lower than a threshold value. The controller may estimate the final position of the tail of the vehicle queue 130 as shown in the above Equation 6.

Figure 4A:
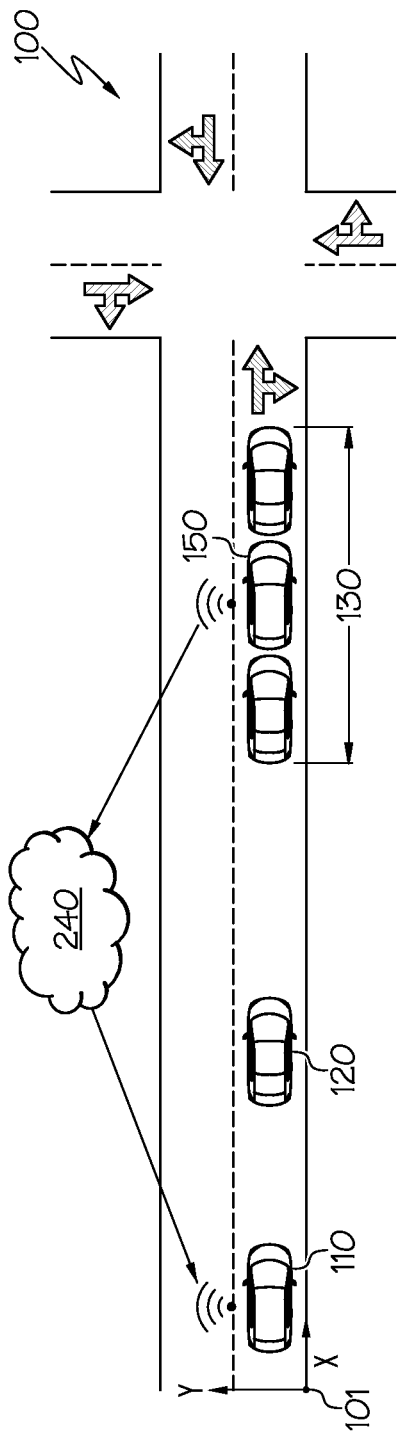
FIGS. 4A-4B depict an exemplary system of estimating the position of a tail of a vehicle queue, according to one or more embodiments shown and described herein.
Figure 4B:
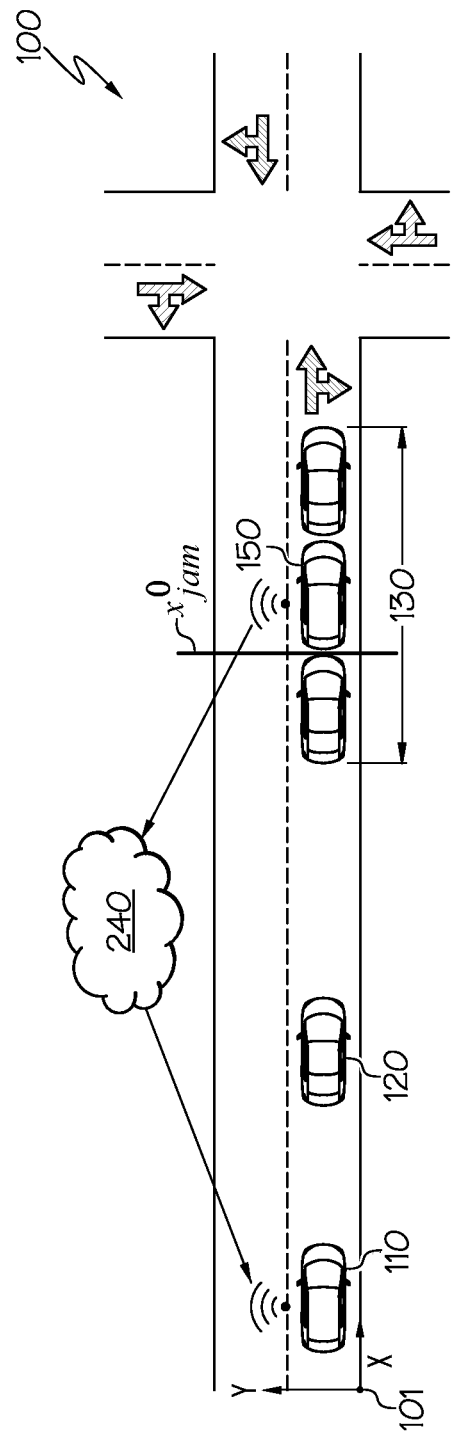
Figure 5A:
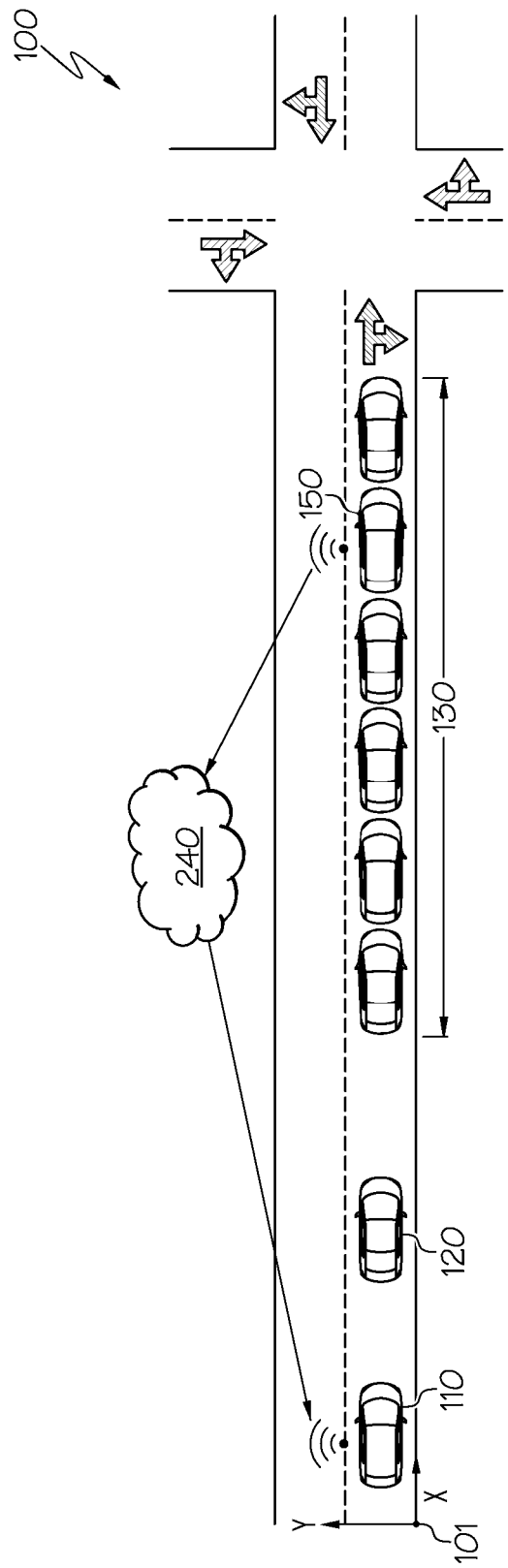
Figure 5B:
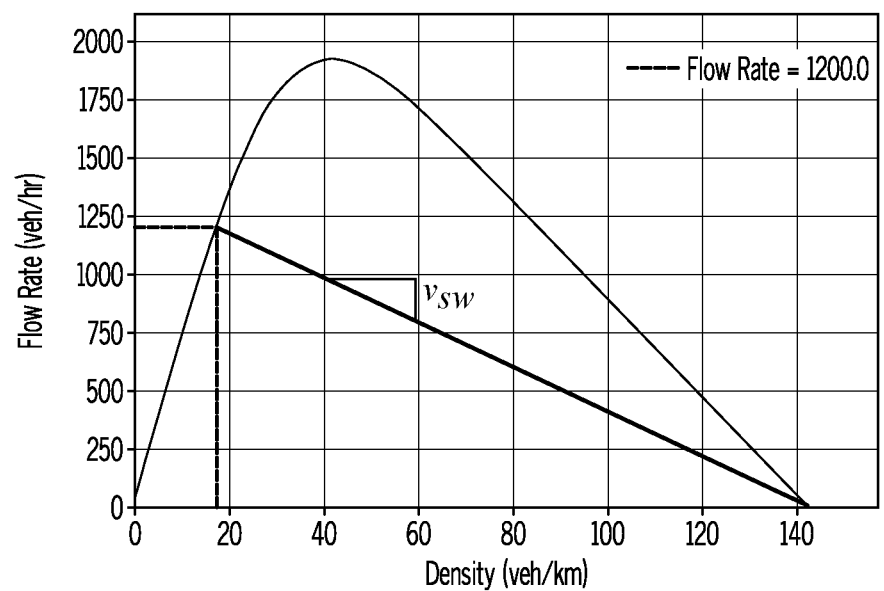

FIGS. 4A-4B depict an exemplary system of estimating a position of a tail of a vehicle queue 130, according to one or more embodiments shown and described herein.

Referring to FIG. 4A, the vehicle queue 130 may exist and stop at the intersection. The map of the intersection may be stored in the server 240. The vehicle queue 130 may include a plurality of vehicles. The connected vehicle 150 may be positioned in the vehicle queue 130. The connected vehicle 150 may communicate with the ego vehicle 110, the server 240, or both. The connected vehicle 150 may transmit its data to the ego vehicle 110, the server 240, or both. The data of the connected vehicle 150 may include the driving data of the connected vehicle 150 such as a velocity of the connected vehicle 150, an acceleration of the connected vehicle 150, a position of the connected vehicle 150 relative to the beginning of the road section 101, a position of the connected vehicle 150 relative to the ego vehicle 110, or combinations thereof.

Referring to FIG. 4B, the ego vehicle 110 may determine a tail of the connected vehicle 150 as the initial estimated position of the tail of the vehicle queue 130. The tail of the connected vehicle 150 may refer the backside of the connected vehicle 150. The data of the tail of the connected vehicle 150 may be stored in the server 240, such as a cloud server 240. The data of the tail of the connected vehicle 150 may be transferred from the connected vehicle 150 to the ego vehicle 110.

Similar to FIG. 1D, the ego vehicle 110 may estimate a distance between the preceding vehicle 120 and the tail of the vehicle queue 130 based on driving data of the preceding vehicle 120. In some embodiments, the ego vehicle 110 may estimate a velocity of the preceding vehicle 120, an acceleration of the preceding vehicle 120, and a position of the preceding vehicle 120 relative to the beginning of the road section 101. In embodiments, the ego vehicle 110 may estimate the velocity of the preceding vehicle 120 and the velocity difference between the preceding vehicle 120 and the closest vehicle in the vehicle queue 130 from the preceding vehicle 120 using the vehicle sensors of the ego vehicle 110. The ego vehicle 110 may estimate the acceleration of the preceding vehicle 120 by using a car-following model as shown in the above Equation 2 and Equation 3.

Similar to FIG. 1D, the ego vehicle 110 may estimate a position of the tail based on the estimated distance and distance between the beginning of the road section 101 and the preceding vehicle 120. For example, in response to estimating the distance ($\widehat{s_H}$), the ego vehicle 110 may estimate a position of the tail of the vehicle queue 130 as shown in the above Equation 4. The ego vehicle 110 may estimate the position of the tail of the vehicle queue 130 using a moving average method as shown in the above Equation 5.

Similar to FIG. 1E, the ego vehicle 110 may estimate a final position of the tail based on the initial estimated position and the estimated position of the tail of the vehicle queue 130. In embodiments, the ego vehicle 110 may estimate a first position of the tail at a first time based on a moving average of the estimated position of the tail. The ego vehicle 110 may estimate a second position of the tail at a second time based on the moving average of the estimated position of the tail. The ego vehicle 110 may determine the second position of the tail of the vehicle queue 130 at the second time as the final position of the tail of the vehicle queue 130 in response to determining that a difference between the first position of the tail of the vehicle queue 130 at the first time and the second position of the tail of the vehicle queue 130 at the second time is lower than a threshold value. The ego vehicle 110 may estimate the final position of the tail of the vehicle queue 130 as shown in the above Equation 6.

FIGS. 5A-5C depict an exemplary system of estimating a position of a tail of a vehicle queue 130, according to one or more embodiments shown and described herein.

Referring to FIG. 5A, the vehicle queue 130 may exist and stop at the intersection. The map of the intersection may be stored in the server 240. The vehicle queue 130 may include a plurality of vehicles. The connected vehicle 150 may be positioned in the vehicle queue 130. In FIG. 5A, there are more vehicles between the ego vehicle 110 and the connected vehicle 150 compared to FIG. 4A.

The ego vehicle 110 may estimate a position of the tail of the connected vehicle 150 at a first time. In embodiments, the connected vehicle 150 may transfer the data of the position of the tail of the connected vehicle 150 at the first time to the server 240. The ego vehicle 110 may receive the data of the position of the tail of the connected vehicle 150 at the first time from the server 240. The ego vehicle 110 may estimate traffic flow rate on the road on which the ego vehicle 110 is driving, traffic density on the road on which the ego vehicle 110 is driving, or both. In some embodiments, the traffic flow rate, the traffic density, or both, may be estimated by the vehicle sensors of the ego vehicle 110, the vehicle sensors of the preceding vehicle 120, the vehicle sensors of the connected vehicle 150, or combinations thereof. In some embodiments, the connected vehicle 150 may estimate the traffic flow rate, the traffic density, or both and then transfer the data of the traffic flow rate, the traffic density, or both to the server 240. The ego vehicle 110 may receive the data of the traffic flow rate, the traffic density, or both from the server 240.

Using a macroscopic traffic model shown in FIG. 5B, the ego vehicle 110 may estimate both traffic flow rate and traffic density when the ego vehicle 110 only estimate one of the traffic flow rate and the traffic density. The macroscopic model shows a differential flow rate (y-axis) as a function of the traffic density (x-axis). For example, when the ego vehicle 110 estimates the traffic density as 19 veh/km, the traffic flow may be calculated as 1200 veh/hr at a first time as shown in FIG. 5B.

The ego vehicle 110 may estimate the average speed ($v_{sw}$) of the tail of the vehicle queue 130 based on the estimated traffic flow rate, the estimated traffic density, or both. For example, the ego vehicle 110 may estimate the average speed ($v_{sw}$) of the tail of the vehicle queue 130 based on the estimated traffic flow rate, the estimated traffic density, or both, using a macroscopic traffic model as shown in FIG. 5B. Using a macroscopic traffic model, the ego vehicle 110 may estimate the average speed ($v_{sw}$) of the tail of the vehicle queue 130. For example, the average speed ($v_{sw}$) of the tail of the vehicle queue 130 may be equal to a slope of the line from a current traffic state (for example, at a first time where the traffic density is 19 veh/km and the traffic flow is 1200 veh/hr) to a jam state (for example, at a second time where the traffic density and the traffic flow are 0).

Referring to FIG. 5C, the ego vehicle 110 may determine the initial estimated position of the tail of the vehicle queue 130 at a second time (t2) based on the estimated position of the tail of the connected vehicle 150 at the first time, for example, when the connected vehicle 150 arrives the vehicle queue 130, the average speed ($v_{sw}$) of the tail of the vehicle queue 130, and a difference between the first time (t1) and the second time (t2). The second time (t2) is different from the first time (t1). For example, the initial estimated position of the tail of the vehicle queue 130 at a second time (t2) may be estimated using the following Equation 7. As stated above, the initial estimated position of the tail of the vehicle queue 130 at the first time (t1) may be a position of the tail of the connected vehicle 150 at the first time.

$$x_{jam}^0 = x_{jam}^c - v_{sw} * (t2 - t1) \qquad \text{Equation 7}$$

where $x_{jam}^0$ is the initial estimated position of the tail at the second time (t2); $x_{jam}^c$ is the initial estimated position of the tail at the first time (t1); and $v_{sw}$ is an average speed of the tail of the vehicle queue 130.

Similar to FIG. 1D, the ego vehicle 110 may estimate a distance between the preceding vehicle 120 and the tail of the vehicle queue 130 based on driving data of the preceding vehicle 120. In some embodiments, the ego vehicle 110 may estimate a velocity of the preceding vehicle 120, an acceleration of the preceding vehicle 120, and a position of the preceding vehicle 120 relative to the beginning of the road section 101. In embodiments, the ego vehicle 110 may estimate the velocity of the preceding vehicle 120 and the velocity difference between the preceding vehicle 120 and the closest vehicle in the vehicle queue 130 from the preceding vehicle 120 using the vehicle sensors of the ego vehicle 110. The ego vehicle 110 may estimate the acceleration of the preceding vehicle 120 by using a car-following model as shown in the above Equation 2 and Equation 3.

Similar to FIG. 1D, the ego vehicle 110 may estimate a position of the tail based on the estimated distance and distance between the beginning of the road section 101 and the preceding vehicle 120. For example, in response to estimating the distance ($\widehat{S_H}$), the ego vehicle 110 may estimate a position of the tail of the vehicle queue 130 as shown in the above Equation 4. The ego vehicle 110 may estimate the position of the tail of the vehicle queue 130 using a moving average method as shown in the above Equation 5.

Similar to FIG. 1E, the ego vehicle 110 may estimate a final position of the tail based on the initial estimated position and the estimated position of the tail of the vehicle queue 130. In embodiments, the ego vehicle 110 may estimate a first position of the tail at a first time based on a moving average of the estimated position of the tail. The ego vehicle 110 may estimate a second position of the tail at a second time based on the moving average of the estimated position of the tail. The ego vehicle 110 may determine the second position of the tail of the vehicle queue 130 at the second time as the final position of the tail of the vehicle queue 130 in response to determining that a difference between the first position of the tail of the vehicle queue 130 at the first time and the second position of the tail of the vehicle queue 130 at the second time is lower than a threshold value. The ego vehicle 110 may estimate the final position of the tail of the vehicle queue 130 as shown in the above Equation 6.

FIG. 6 depicts an exemplary system of estimating a position of a tail of a vehicle queue 130, according to one or more embodiments shown and described herein.

Referring to FIG. 6, the vehicle queue 130 may exist on the road. The map of the road may be stored in the server 240. The vehicle queue 130 may include a plurality of vehicles. The connected vehicle 150 may be positioned in the vehicle queue 130. In FIG. 6, the vehicle queue 130 is moving while the vehicle queue 130 is not moving.

Similar to FIG. 5A, the ego vehicle 110 may estimate a position of the tail of the connected vehicle 150 at a first time, for example, when the connected vehicle 150 arrives the vehicle queue 130. The ego vehicle 110 may further obtain a speed of the connected vehicle 150 at the first time, for example, when the connected vehicle 150 arrives the vehicle queue 130. In embodiments, the connected vehicle 150 may transfer the data of the position of the tail of the connected vehicle 150 and the speed of the connected vehicle 150 at the first time, for example, when the connected vehicle 150 arrives the vehicle queue 130 to the server 240. The ego vehicle 110 may receive the data of the position of the tail of the connected vehicle 150 and the speed of the connected vehicle 150 at the first time from the server 240.

In embodiments, the ego vehicle 110 may determine the speed of the connected vehicle 150 as an initial estimated speed of the vehicle queue 130. The ego vehicle 110 may receive the data of the speed of the connected vehicle 150 from the server 240, such as a cloud server 240, from the connected vehicle 150, or both.

The ego vehicle 110 may estimate traffic flow rate on the road on which the ego vehicle 110 is driving, traffic density on the road on which the ego vehicle 110 is driving, or both. In some embodiments, the traffic flow rate, the traffic density, or both, may be estimated by the vehicle sensors of the ego vehicle 110, the vehicle sensors of the preceding vehicle 120, the vehicle sensors of the connected vehicle 150, or combinations thereof. The traffic flow rate, the traffic density, or both, may be estimated based on the initial estimated speed of the vehicle queue 130.

The ego vehicle 110 may estimate the average speed ($v_{sw}$) of the tail of the vehicle queue 130 based on the estimated traffic flow rate, the estimated traffic density, for example using a macroscopic traffic model as shown in FIG. 5B.

Similar to FIG. 5C, the ego vehicle 110 may determine the initial estimated position of the tail of the vehicle queue 130 at a second time (t2) based on the estimated position of the tail of the connected vehicle 150 at the first time, for example, when the connected vehicle 150 arrives the vehicle queue 130, the average speed ($v_{sw}$) of the tail of the vehicle queue 130, and a difference between the first time (t1) and the second time (t2). The ego vehicle 110 may determine the initial estimated position of the tail of the vehicle queue 130 at a second time (t2) using the above Equation 7.

Similar to FIG. 1D, the ego vehicle 110 may estimate a distance between the preceding vehicle 120 and the tail of the vehicle queue 130 based on driving data of the preceding vehicle 120. In some embodiments, the ego vehicle 110 may estimate a velocity of the preceding vehicle 120, an acceleration of the preceding vehicle 120, and a position of the preceding vehicle 120 relative to the beginning of the road section 101. In this example, the velocity of the closest vehicle in the vehicle queue 130 is assumed to be the velocity of the connected vehicle 150. In embodiments, the ego vehicle 110 may estimate the velocity of the preceding vehicle 120 and the velocity difference between the preceding vehicle 120 and the closest vehicle in the vehicle queue 130 from the preceding vehicle 120 using the vehicle sensors of the ego vehicle 110. The ego vehicle 110 may estimate the acceleration of the preceding vehicle 120 by using a car-following model as shown in the above Equation 2 and Equation 3. Based on the acceleration ($accel_\alpha$) of the preceding vehicle 120, the velocity ($v_\alpha$) of the preceding vehicle 120, the velocity difference ($\Delta v_\alpha$) between the preceding vehicle 120 and the closest vehicle in the vehicle queue 130, the ego vehicle 110 estimates a distance ($\widehat{s_H}$) between the preceding vehicle 120 and the tail of the vehicle queue 130 using the equation $\widehat{s_{H4}} = f(accel_\alpha, v_\alpha, \Delta v_\alpha)$.

Similar to FIG. 1D, the ego vehicle 110 may estimate a position of the tail based on the estimated distance and distance between the beginning of the road section 101 and the preceding vehicle 120. For example, in response to estimating the distance ($\widehat{s_H}$), the ego vehicle 110 may estimate a position of the tail of the vehicle queue 130 as shown in the above Equation 4. The ego vehicle 110 may estimate the position of the tail of the vehicle queue 130 using a moving average method as shown in the above Equation 5.

Similar to FIG. 1E, the ego vehicle 110 may estimate a final position of the tail based on the initial estimated position and the estimated position of the tail of the vehicle queue 130. In embodiments, the ego vehicle 110 may estimate a first position of the tail at a first time based on a moving average of the estimated position of the tail. The ego vehicle 110 may estimate a second position of the tail at a second time based on the moving average of the estimated position of the tail. The ego vehicle 110 may determine the second position of the tail of the vehicle queue 130 at the second time as the final position of the tail of the vehicle queue 130 in response to determining that a difference between the first position of the tail of the vehicle queue 130 at the first time and the second position of the tail of the vehicle queue 130 at the second time is lower than a threshold value. The ego vehicle 110 may estimate the final position of the tail of the vehicle queue 130 as shown in the above Equation 6.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method comprising:
   determining an initial estimated position of a tail of a vehicle queue comprising a plurality of vehicles relative to a beginning of a road section using one or more sensors of an ego vehicle;
   estimating distance between a preceding vehicle and the tail of the vehicle queue based on driving data of the preceding vehicle;
   estimating a position of the tail based on the estimated distance and distance between the beginning of the road section and the preceding vehicle;
   estimating a final position of the tail based on the initial estimated position and the estimated position of the tail; and controlling the ego vehicle to execute a maneuver based at least in part on the estimated final position of the tail.

2. The method according to claim 1, further comprising:
estimating a first position of the tail at a first time based on a moving average of the estimated position of the tail;
estimating a second position of the tail at a second time based on the moving average of the estimated position of the tail; and
determining the second position of the tail at the second time as the final position of the tail in response to determining that a difference between the first position of the tail at the first time and the second position of the tail at the second time is lower than a threshold value.

3. The method according to claim 1, wherein a middle point of a potential jam area including the vehicle queue determined as the initial estimated position of the tail.

4. The method according to claim 1, wherein a connected vehicle is positioned in the vehicle queue, and a tail of the connected vehicle is determined as the initial estimated position of the tail.

5. The method according to claim 1, further comprising:
estimating a position of the tail of a connected vehicle at a first time;
estimating traffic flow rate, traffic density, or both;
estimating an average speed of a tail of the vehicle queue based on the estimated traffic flow rate, the estimated traffic density, or both; and
determining the initial estimated position of the tail at a second time based on the estimated position of the tail of the connected vehicle at the first time, the average speed of the tail of the vehicle queue, and a difference between the first time and the second time.

6. The method according to claim 5, wherein the average speed of the tail of the vehicle queue is determined using a macroscopic traffic model.

7. The method according to claim 5,
wherein the vehicle queue is moving,
the method further comprises:
estimating a position of the tail of a connected vehicle and a speed of the connected vehicle at a first time;
determining the speed of the connected vehicle as an initial estimated speed of the vehicle queue;
estimating traffic flow rate, traffic density, or both based on the initial estimated speed of the vehicle queue;
estimating an average speed of a tail of the vehicle queue based on the estimated traffic flow rate, the estimated traffic density, or both; and
determining the initial estimated position of the tail at a second time based on the estimated position of the tail of the connected vehicle at the first time, the average speed of the tail of the vehicle queue, and a difference between the first time and the second time.

8. The method according to claim 1, wherein the driving data of the preceding vehicle comprises a velocity of the preceding vehicle, an acceleration of the preceding vehicle, and a position of the preceding vehicle relative to the beginning of the road section.

9. The method according to claim 1, wherein the one or more sensors of the ego vehicle comprise at least one of a camera and a time of flight sensor.

10. A system comprising:
a controller programmed to:
determine an initial estimated position of a tail of a vehicle queue comprising a plurality of vehicles relative to a beginning of a road section using one or more sensors of an ego vehicle;
estimate a distance between a preceding vehicle and the tail of the vehicle queue based on driving data of the preceding vehicle;
estimate a position of the tail based on the estimated distance and distance between the beginning of the road section and the preceding vehicle;
estimate a final position of the tail based on the initial estimated position and the estimated position of the tail; and
control the ego vehicle to execute a maneuver based at least in part on the estimated final position of the tail.

11. The system according to claim 10, wherein the controller is further programmed to:
estimate a first position of the tail at a first time based on a moving average of the estimated position of the tail;
estimate a second position of the tail at a second time based on the moving average of the estimated position of the tail; and
determine the second position of the tail at the second time as the final position of the tail in response to determining that a difference between the first position of the tail at the first time and the second position of the tail at the second time is lower than a threshold value.

12. The system according to claim 10, wherein a middle point of a potential jam area including the vehicle queue determined as the initial estimated position of the tail.

13. The system according to claim 10, wherein a connected vehicle is positioned in the vehicle queue, and a tail of the connected vehicle is determined as the initial estimated position of the tail.

14. The system according to claim 10, wherein the controller is further programmed to:
estimate a position of the tail of a connected vehicle at a first time;
estimate traffic flow rate, traffic density, or both;
estimate an average speed of a tail of the vehicle queue based on the estimated traffic flow rate, the estimated traffic density, or both; and
determine the initial estimated position of the tail at a second time based on the estimated position of the tail of the connected vehicle at the first time, the average speed of the tail of the vehicle queue, and a difference between the first time and the second time.

15. The system according to claim 14, wherein the traffic flow rate, the traffic density, or both, are estimated by the one or more sensors of the ego vehicle.

16. The system according to claim 14, wherein the average speed of the tail of the vehicle queue is determined using a macroscopic traffic model.

17. The system according to claim 14,
wherein the vehicle queue is moving,
wherein the controller is further programmed to:
estimate a position of the tail of a connected vehicle and a speed of the connected vehicle at a first time;
determine the speed of the connected vehicle as an initial estimated speed of the vehicle queue;
estimate traffic flow rate, traffic density, or both based on the initial estimated speed of the vehicle queue;
estimate an average speed of a tail of the vehicle queue based on the estimated traffic flow rate, the estimated traffic density, or both; and
determine the initial estimated position of the tail at a second time based on the estimated position of the tail of the connected vehicle at the first time, the average speed of the tail of the vehicle queue, and a difference between the first time and the second time.

18. The system according to claim 10, wherein the driving data of the preceding vehicle comprises a velocity of the preceding vehicle, an acceleration of the preceding vehicle, and a position of the preceding vehicle relative to the beginning of the road section.

19. A non-transitory computer-readable medium storing programs that, when executed by a controller, cause the controller to:

determine an initial estimated position of a tail of a vehicle queue comprising a plurality of vehicles relative to a beginning of a road section using one or more sensors of an ego vehicle;

estimate a distance between a preceding vehicle and the tail of the vehicle queue based on driving data of the preceding vehicle;

estimate a position of the tail based on the estimated distance and distance between the beginning of the road section and the preceding vehicle;

estimate a final position of the tail based on the initial estimated position and the estimated position of the tail; and control the ego vehicle to execute a maneuver based at least in part on the estimated final position of the tail.

20. The non-transitory computer-readable medium according to claim 19, wherein the controller is further programmed to:

estimate a first position of the tail at a first time based on a moving average of the estimated position of the tail;

estimate a second position of the tail at a second time based on the moving average of the estimated position of the tail; and determine the second position of the tail at the second time as the final position of the tail in response to determining that a difference between the first position of the tail at the first time and the second position of the tail at the second time is lower than a threshold value.

* * * * *